US012783130B2

(12) United States Patent
Pang et al.

(10) Patent No.: US 12,783,130 B2
(45) Date of Patent: Nov. 3, 2026

(54) CLUSTERING FRONT-END TRACKS TO OPTIMIZE BACK-END WRITE OPERATIONS

(71) Applicant: Dell Products L.P., Round Rock, TX (US)

(72) Inventors: Lixin Pang, Needham, MA (US); Rong Yu, West Roxbury, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 18/923,176

(22) Filed: Oct. 22, 2024

(65) Prior Publication Data

US 2026/0111119 A1 Apr. 23, 2026

(51) Int. Cl.
*G06F 3/06* (2006.01)
*G06N 20/00* (2019.01)

(52) U.S. Cl.
CPC .......... *G06F 3/0616* (2013.01); *G06F 3/0659* (2013.01); *G06F 3/0689* (2013.01); *G06N 20/00* (2019.01)

(58) Field of Classification Search
CPC .... G06F 3/0616; G06F 3/0659; G06F 3/0689; G06N 20/00
See application file for complete search history.

(56) References Cited

U.S. PATENT DOCUMENTS

| | | | | |
|---|---|---|---|---|
| 2007/0220200 | A1 * | 9/2007 | Gill | G06F 12/0868 711/E12.072 |
| 2009/0216960 | A1 * | 8/2009 | Allison | G06F 13/1642 711/149 |
| 2013/0132664 | A1 * | 5/2013 | Benhase | G06F 12/126 711/E12.019 |
| 2019/0129834 | A1 * | 5/2019 | Purkayastha | G06N 20/00 |
| 2022/0229589 | A1 * | 7/2022 | Pang | G06F 3/0689 |

* cited by examiner

*Primary Examiner* — Kalpit Parikh
(74) *Attorney, Agent, or Firm* — Harrity & Harrity, LLP

(57) ABSTRACT

In some implementations, a control device may receive a plurality of front-end (FE) write pending (WP) tracks. The control device may cluster the plurality of FE WP tracks into one or more FE extent objects using spatial correlations. The control device may add the one or more FE extent objects to a tree data structure. The control device may form back-end (BE) slices using a mapping of the one or more FE extent objects from the tree data structure and to the BE slices based on an aging threshold.

20 Claims, 10 Drawing Sheets

CLUSTERING FRONT-END TRACKS TO OPTIMIZE BACK-END WRITE OPERATIONS

BACKGROUND

Data storage systems, especially those incorporating arrays of storage devices, help manage large amounts of digital information. These arrays may be organized into a redundant array of independent disks such that multiple storage devices (e.g., physical drives) are organized into a single logical storage. A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to bank account deposits/withdrawals. In addition, storage arrays can include a central management system (CMS) that manages the data and delivers one or more distributed storage services for an organization. The central management system can include one or more processors that perform data storage services

SUMMARY

Some implementations described herein relate to a method. The method may include receiving, by a control device, a plurality of front-end (FE) write pending (WP) tracks. The method may include clustering, by the control device, the plurality of FE WP tracks into one or more FE extent objects using spatial correlations. The method may include adding, by the control device, the one or more FE extent objects to a tree data structure. The method may include forming back-end (BE) slices, by the control device, using a mapping of the one or more FE extent objects from the tree data structure and to the BE slices based on an aging threshold.

Some implementations described herein relate to a device that includes one or more processors. The one or more processors may be configured to generate an FE extent object representing a set of correlated FE WP tracks. The one or more processors may be configured to determine, for the FE extent object, a probability of receiving an additional correlated FE WP track within a defined time window using a forecasting model. The one or more processors may be configured to form BE slices using a mapping of the set of correlated FE WP tracks from the FE extent object to the BE slices based on the probability from the forecasting model.

Some implementations described herein relate to a non-transitory computer-readable medium that stores a set of instructions. The set of instructions, when executed by one or more processors of a device, may cause the device to receive a set of FE WP tracks. The set of instructions, when executed by one or more processors of the device, may cause the device to generate an FE extent object to group the set of FE WP tracks based on correlations between the FE WP tracks in the set. The set of instructions, when executed by one or more processors of the device, may cause the device to determine, for the FE extent object, a probability of receiving an additional FE WP track using a forecasting model. The set of instructions, when executed by one or more processors of the device, may cause the device to age the FE extent object using a tree data structure and the probability from the forecasting model. The set of instructions, when executed by one or more processors of the device, may cause the device to form at least one BE slice using a mapping of the FE extent object, after aging, to the at least one BE slice for writing.

DETAILED DESCRIPTION

Figure 1A:
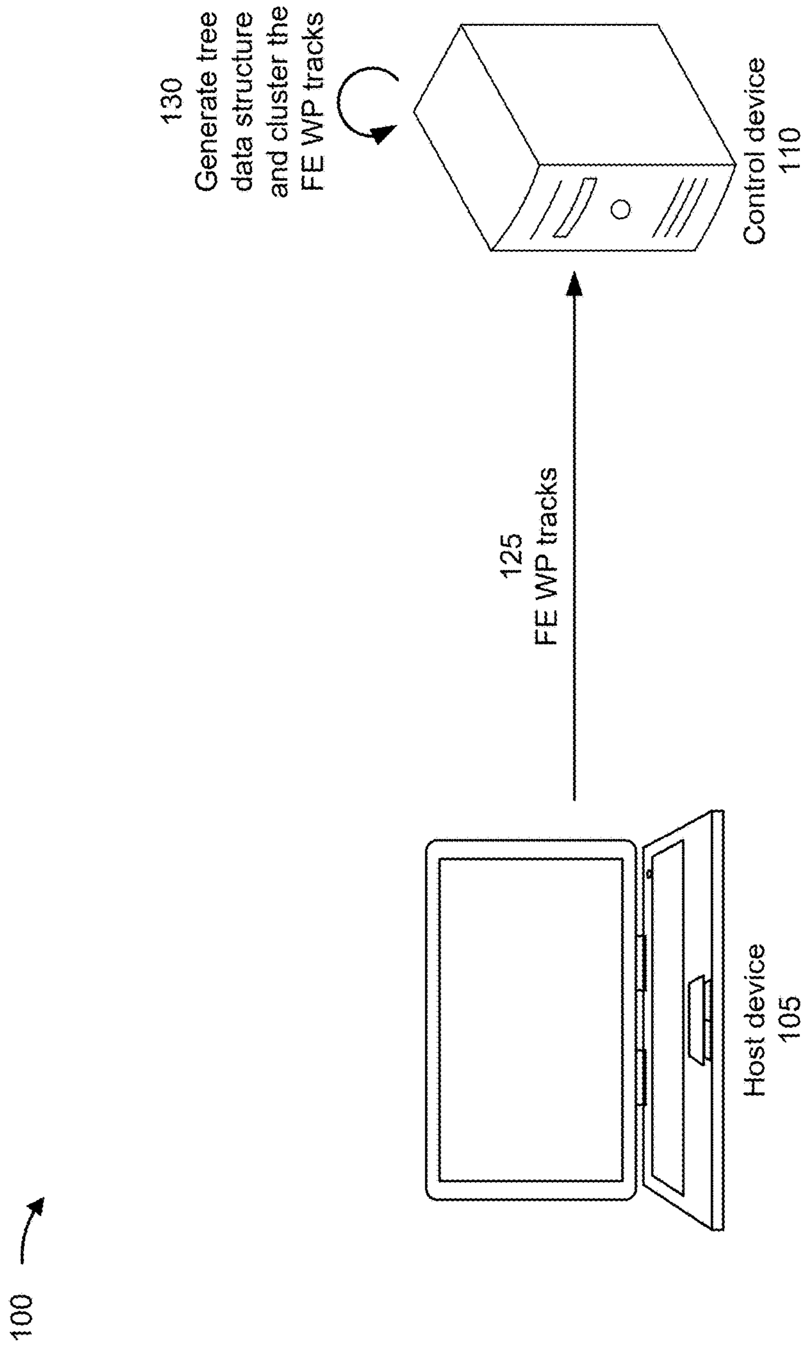
FIGS. 1A-1E are diagrams of an example implementation relating to clustering FE tracks to optimize BE write operations, in accordance with some embodiments of the present disclosure.

The following detailed description of example implementations refers to the accompanying drawings. The same reference numbers in different drawings may identify the same or similar elements.

Storage array systems generally use an array of disks configured in a redundant array of independent disks (RAID) configuration in order to store and manage data efficiently while ensuring fault tolerance. A business, such as a financial or technology corporation, can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

In such systems, BE tracks (also referred to as "members") may be grouped to form a single RAID slice with protection schemes. However, these systems may cause a waste of computing resources during write operations. In particular, during relocation of write operations, FE tracks (e.g., incoming input/output (I/O) commands from a host device) are often grouped randomly for de-staging to BE slices. As a result, subsequent write operations are less likely to include FE tracks in a same group, which leads to suboptimal writes. Suboptimal writes impact performance by resulting in additional disk reads for RAID calculations (e.g., XOR calculations for write operations). Additionally, random grouping of FE tracks increases fragmentation and physical wear on the array of disks.

Some implementations described herein provide a method for optimizing write operations to BE slices by clustering FE write pending (WP) tracks. For example, FE WP tracks may be logically clustered into one or more FE extent objects using spatial correlations. Additionally, the FE extent object(s) may be organized within a tree data structure for mapping to BE slices. For example, the BE slices may be formed based on an aging threshold applied to the FE extent object(s) in the tree data structure. As a result, subsequent write operations are more likely to include FE WP tracks in a same (or at least overlapping) group, which leads to improved writes (e.g., writes that involve fewer disk reads for RAID calculations). Additionally, clustering the FE WP tracks reduces fragmentation and physical wear on the array of disks.

FIGS. 1A-1E are diagrams of an example 100 associated with clustering FE tracks to optimize BE write operations. As shown in FIGS. 1A-1E, example 100 includes a host device 105, a control device 110, a machine learning (ML) host 115 (e.g., providing an ML model), and a set of storage devices 120 (e.g., an array of storage disks). These devices are described in more detail in connection with FIGS. 3 and 4.

As shown in FIG. 1A and by reference number 125, the host device 105 may transmit, and the control device 110 may receive, a set of FE WP tracks (e.g., including a plurality of FE WP tracks). For example, the host device 105 may transmit the set of FE WP tracks for storage on the set of storage devices 120. In some implementations, the host device 105 may transmit the set of FE WP tracks in response to input from a user. For example, the user may save a file, move a file, and/or copy-and-paste a file, among other examples. Therefore, the set of FE WP tracks may represent file operations requested by the user. Additionally, or alternatively, the host device 105 may transmit the set of FE WP tracks automatically. For example, the host device 105 may be configured to automatically generate backups. Therefore, the set of FE WP tracks may represent backup operations and/or other automatic operations performed by the host device 105. As used herein, "track" may refer to a set of sequential blocks (e.g., a portion of a file), where the blocks are in sequence from the perspective of the host device 105. Additionally, "front-end" or "FE" may refer to tracks associated with an upper layer (e.g., an operating system (OS) layer) as distinguished from a lower layer (e.g., a driver or physical layer). Accordingly, "back-end" or "BE" may refer to slices associated with the lower layer.

As shown by reference number 130, the control device 110 may generate a tree data structure. For example, the tree data structure may include a B-Tree structure, among other examples. The control device 110 may add the FE WP tracks to the tree data structure.

As further shown by reference number 130, the control device 110 may cluster the set of FE WP tracks. For example, the control device 110 may cluster the set of FE WP tracks using spatial correlations (e.g., using correlations between logical block addresses (LBAs) associated with the FE WP tracks).

In some implementations, the control device 110 may initialize FE extent objects (e.g., one or more FE extent objects) representing the set of FE WP tracks. For example, an FE extent object may be a class or another type of logical data structure that represents correlated FE WP tracks. Therefore, the FE extent objects may group the set of FE WP tracks based on correlations between the FE WP tracks in the set. In other words, the control device 110 may cluster the set of FE WP tracks into the FE extent objects (e.g., using spatial correlations, as described above).

The control device 110 may add the FE extent objects to the tree data structure. Therefore, the control device 110 may add the FE WP tracks to the tree data structure by adding the FE extent objects to the tree data structure. Using the tree data structure to group FE WP tracks results in more optimized writes because BE slices (as described in connection with FIG. 1E) are more likely to include correlated tracks, which helps reduce read operations used in future write operations.

Figure 1B:
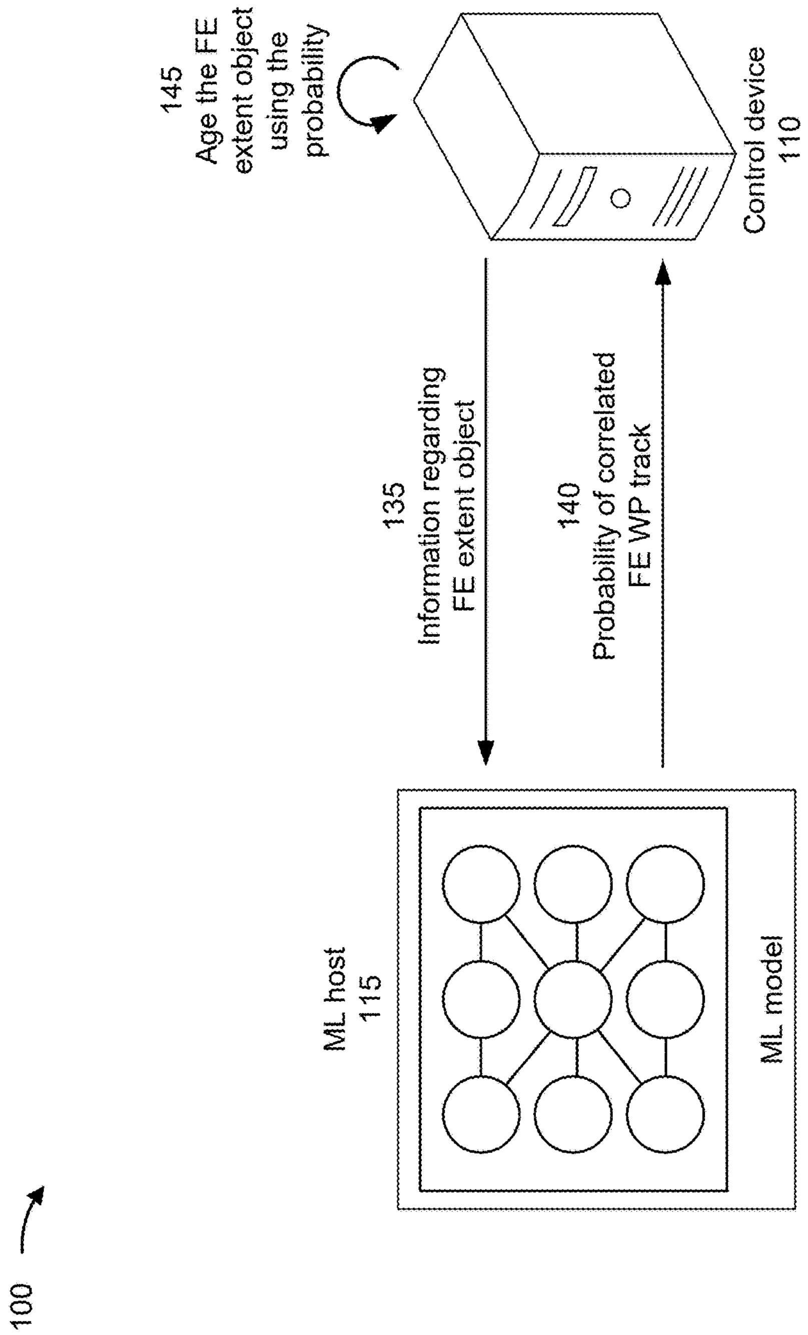

As shown in FIG. 1B and by reference number 135, the control device 110 may provide information regarding one of the FE extent objects to the ML model (via the ML host 115). For example, the control device may transmit, and the ML host 115 (associated with the ML model) may receive, a request including the information. The ML host 115 may include a server, such as an application server, a client server, a web server, a database server, a host server, a proxy server, a virtual server (e.g., executing on computing hardware), or a server in a cloud computing system that provides access to the ML model (e.g., via one or more application programming interfaces (APIs)). The ML host 115 may be the same device that trains the ML model, or may be at least partially separate therefrom (e.g., physically, virtually, and/or logically). Although the example 100 is described with the ML host 115 being separate from the control device 110, the ML host 115 may be wholly or at least partially integrated (e.g., physically, virtually, and/or logically) with the control device 110.

The ML model may be a forecasting model. For example, the ML model may be as described in connection with FIGS. 2A-2B. As shown by reference number 140, the ML model may output (via the ML host 115) a probability of receiving an additional correlated FE WP track (within a defined time window). For example, the ML host 115 (associated with the ML model) may transmit, and the control device 110 may receive, a response including the probability. Therefore, the ML model may predict how likely the control device is to receive an additional FE WP track that will be clustered (or grouped) into the FE extent object (for which the ML model is calculating the probability).

As shown by reference number 145, the control device 110 may age the FE extent object using the probability (and the tree data structure). For example, the control device 110 may calculate an aging time for the FE extent object based on the probability. In one example, the aging time may be decreased when the probability is high (e.g., the FE extent object is marked as younger when an additional FE WP track is likely) and increased when the probability is low (e.g., the FE extent object is marked as older when an additional FE WP track is unlikely). As used herein, "high" may mean greater than (or equal to) a threshold, and "low" may mean less than (or equal to) a threshold (e.g., the same threshold or a different threshold).

The control device 110 may initiate a write operation (e.g., as described in connection with FIG. 1E) when the aging time satisfies an aging threshold. In some implementations, the aging threshold may be fixed (e.g., preconfigured by an administrator or according to a default setting). Alternatively, the aging threshold may be dynamic. For example, in some implementations, the control device 110 may determine the aging threshold based on a quantity of FE WP tracks in the FE extent object. In one example, the aging threshold may be reduced when the quantity is high (e.g., the aging threshold is decreased when more FE WP tracks are in the FE extent object and thus waiting to be written) and increased when the quantity is low (e.g., the aging threshold is increased when fewer FE WP tracks are in the FE extent object).

Additionally, or alternatively, the control device 110 may determine the aging threshold based on a WP pressure. The WP pressure may be based on a total quantity of WP tracks for the set of storage devices. In one example, the aging threshold may be reduced when the quantity is high (e.g., the aging threshold is decreased when more FE WP tracks are waiting to be written) and increased when the quantity is low (e.g., the aging threshold is increased when fewer FE WP tracks are waiting to be written). In some implementations, the WP pressure and the quantity of FE WP tracks may be combined sequentially (e.g., the aging threshold is selected using the quantity and then adjusted based on the WP pressure, or the aging threshold is selected using the WP pressure and then adjusted based on the quantity) or holistically (e.g., using a formula or an algorithm that accepts the quantity and the WP pressure as input) to determine the aging threshold. Using the ML model to generate probabilities reduces latency because write operations are performed more quickly for tracks that are less likely to have correlated tracks arrive in the near future.

Figure 1C:
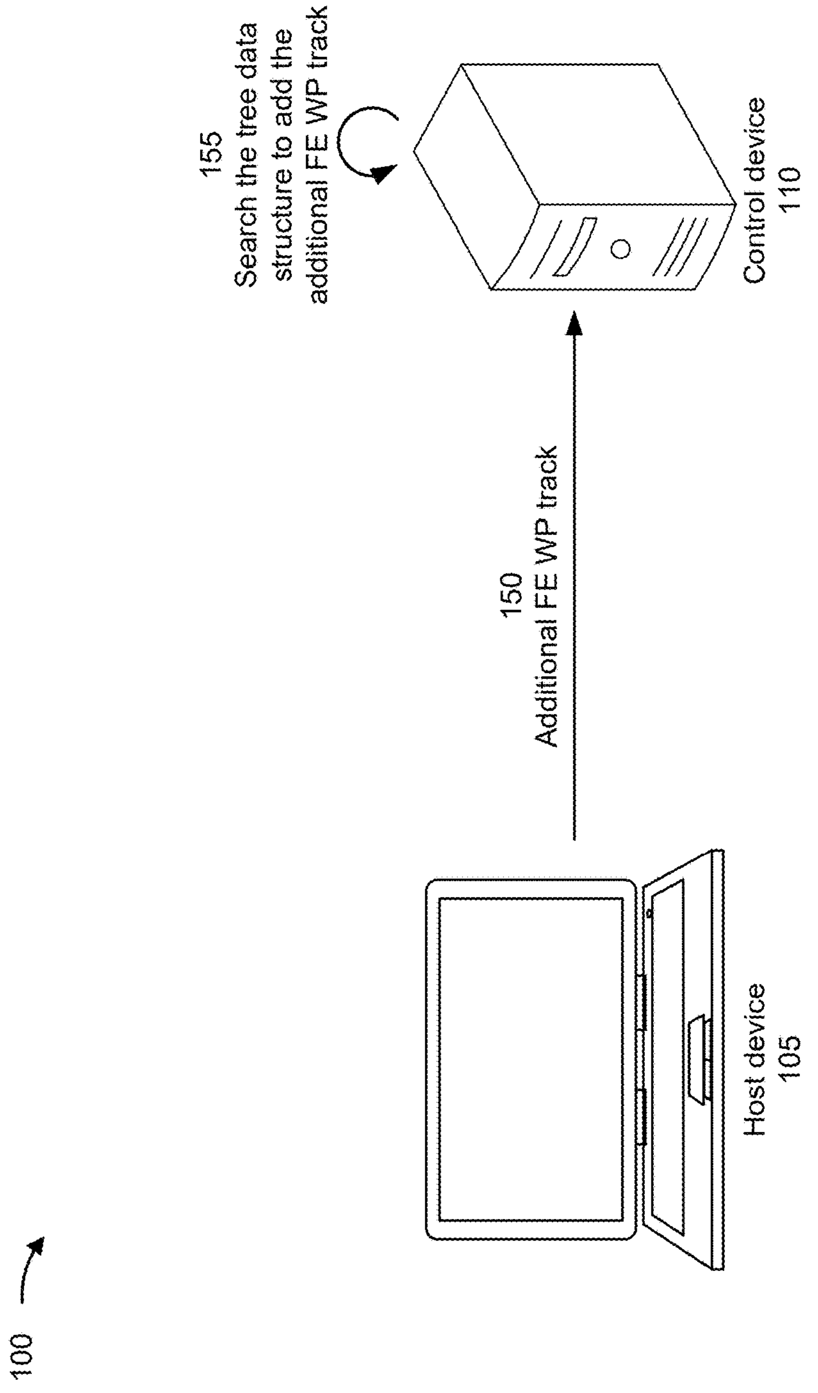

As shown in FIG. 1C and by reference number 150, the host device 105 may transmit, and the control device 110 may receive, an additional FE WP track (e.g., at least one additional FE WP track). For example, the host device 105 may transmit the additional FE WP track for storage on the set of storage devices.

As shown by reference number 155, the control device 110 may search the tree data structure using an index associated with the additional FE WP track. For example, the index may be based on a track number and/or an extent number associated with the additional FE WP track. Accordingly, the control device 110 may add the additional FE WP track to an FE extent object in the tree data structure. For example, the control device 110 may add the additional FE WP track to the FE extent object based on a correlation between the additional FE WP track and FE WP tracks already included in the FE extent object (e.g., a match between the index associated with the additional FE WP track and an index associated with the FE extent object). Therefore, the additional FE WP track may be added to the FE extent object based on an outcome of searching the tree data structure.

Figure 1D:
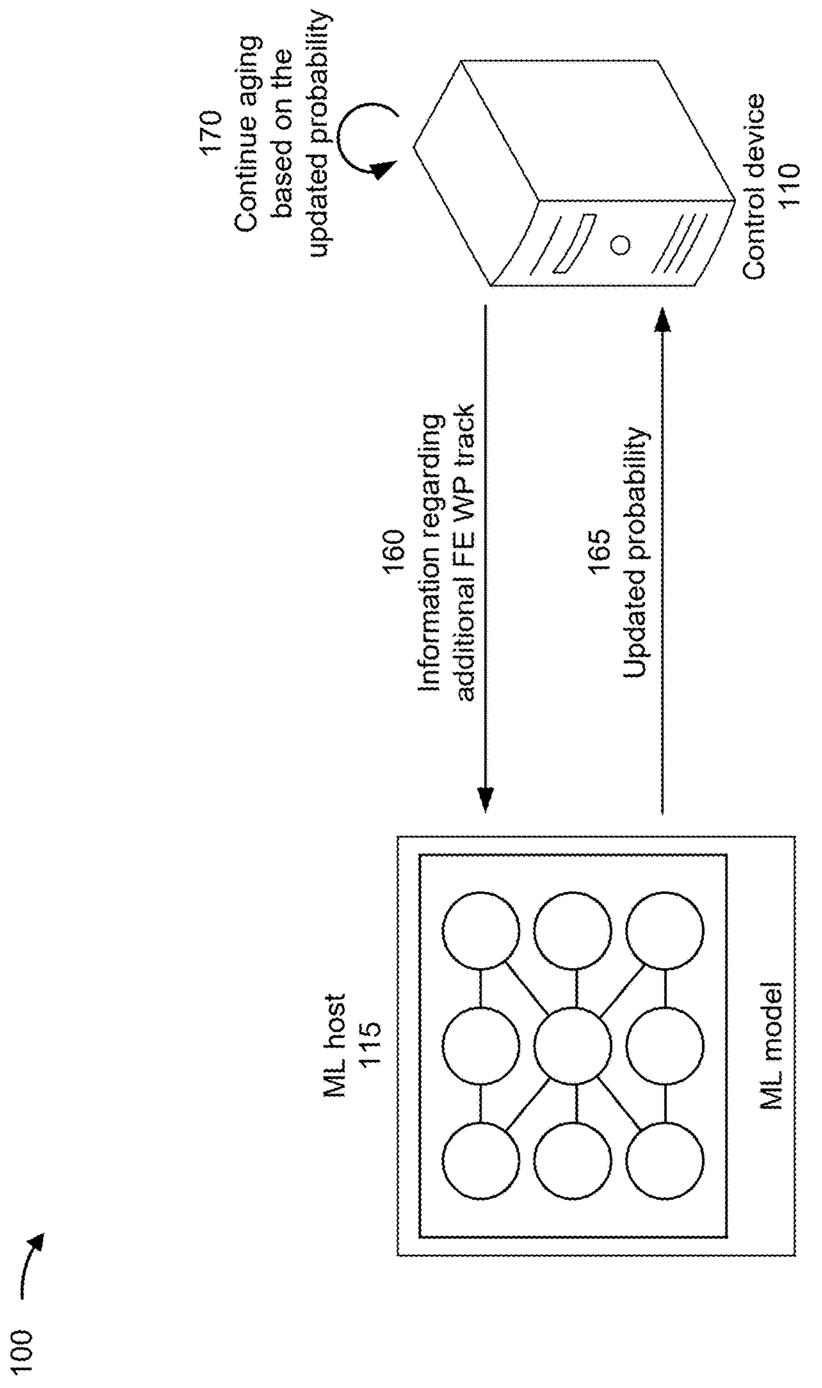

As shown in FIG. 1D and by reference number 160, the control device 110 may provide information regarding the additional FE WP track to the ML model (via the ML host 115). For example, the control device 110 may transmit, and the ML host 115 (associated with the ML model) may receive, a request including the information. Accordingly, the control device 110 may request an updated probability for the FE extent object to which the additional FE WP track was added.

As shown by reference number 165, the ML model (via the ML host 115) may output an updated probability of receiving an additional correlated FE WP track (within a defined time window). For example, the ML host 115 (associated with the ML model) may transmit, and the control device may receive, a response including the updated probability. Therefore, the ML model may predict how likely the control device is to receive an additional FE WP track that will be clustered (or grouped) into the FE extent object (to which the additional FE WP track was added).

As shown by reference number 170, the control device 110 may continue aging the FE extent object using the updated probability (and the tree data structure). For example, the control device 110 may calculate an updated aging time for the FE extent object based on the updated probability (e.g., similar to the manner described above in connection with FIG. 1B). Additionally, or alternatively, the control device 110 may calculate an updated aging threshold for the FE extent object based on an updated quantity of FE WP tracks in the FE extent object and/or an updated WP pressure (e.g., similar to the manner described above in connection with FIG. 1B).

Although the example 100 is described with the additional FE WP track being added to the FE extent object, other examples may include the additional FE WP track being added to a queue for writing. For example, the additional FE WP track may be uncorrelated with existing FE extent objects (e.g., based on the search described in connection with FIG. 1C), and the ML model may generate a low probability (e.g., failing to satisfy a correlation threshold) that the additional FE WP track will be correlated with another track in the near future (e.g., within the window of time). Accordingly, the control device 110 may queue the additional FE WP track for writing (e.g., randomly with other uncorrelated FE WP tracks).

Figure 1E:
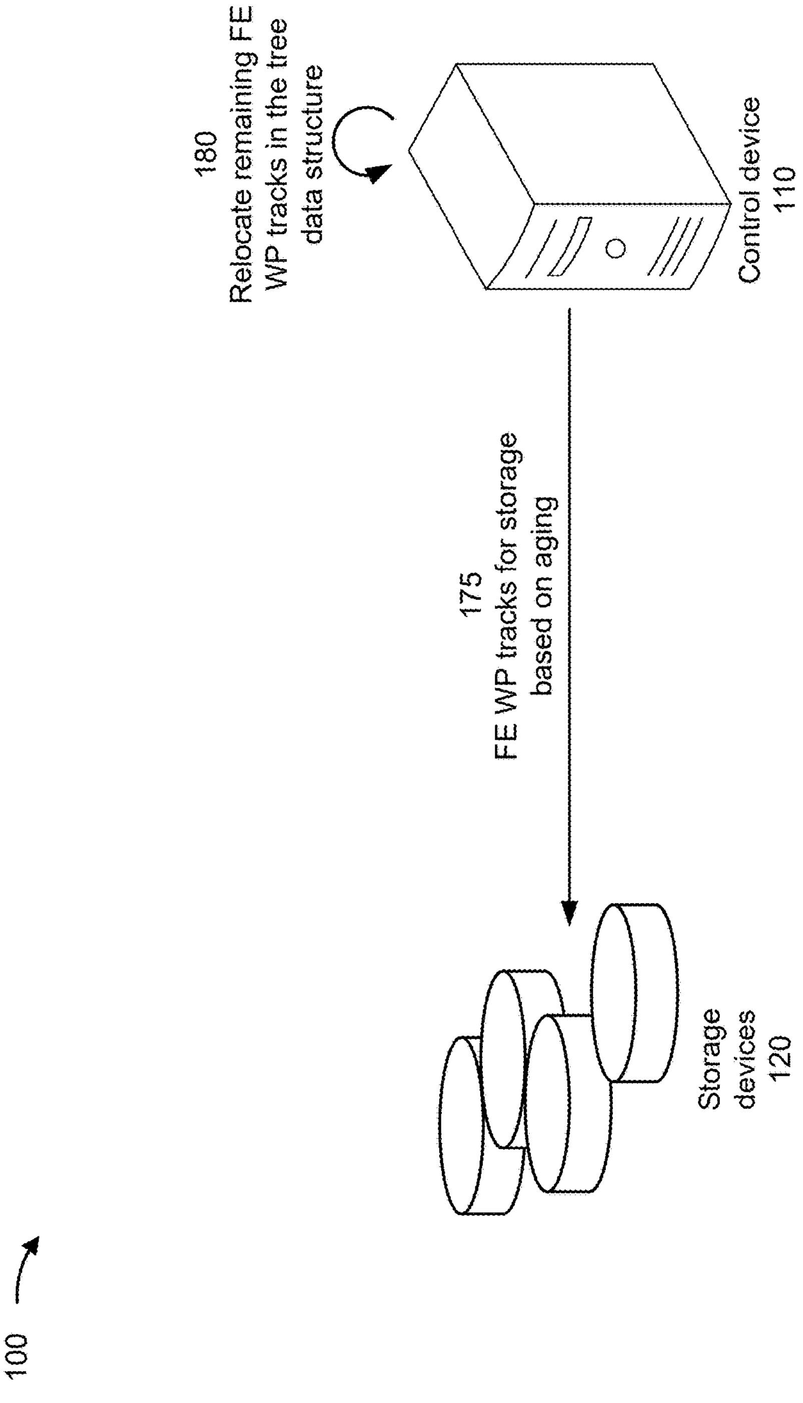

As shown in FIG. 1E and by reference number 175, the control device 110 may transmit FE WP tracks for storage based on aging the FE extent objects. For example, the control device 110 may form BE slices (e.g., at least one BE slice) using a mapping of one (or more) of the FE extent objects to the BE slices. The mapping may be based on the aging threshold. For example, FE WP tracks in an FE extent object may be mapped to a BE slice in response to the aging time associated with the FE extent object satisfying the aging threshold (for the FE extent object). Therefore, the mapping may be based on the probability associated with the FE extent object (because the aging time and/or the aging threshold are based on the probability). In another example, the mapping may be directly based on the probability (e.g., in response to a low probability for FE WP tracks that are uncorrelated, as described above in connection with FIG. 1D).

Because the BE slice includes FE WP tracks that are correlated (e.g., FE WP tracks that were grouped or clustered into a same FE extent object), a future write operation is more likely to include FE WP tracks that depend on the BE slice rather than on a plurality of BE slices. Therefore, fewer read operations (e.g., performed by the control device and/or the set of storage devices in order to perform XOR operations) are performed to enable the future write operation, which conserves computing resources. Additionally, physical wear on the set of storage devices 120 is decreased. Moreover, fragmentation across BE slices is reduced, which speeds up future read operations.

As shown by reference number 180, the control device 110 may relocate remaining FE WP tracks from the FE extent object to a leftover queue (after mapping the FE extent object to the BE slice). For example, the BE slice may accept a maximum quantity of tracks (and/or particular multiples of tracks), such that FE WP tracks over the maximum (or left behind as a modulo) are leftover FE WP tracks. The leftover queue may be a dedicated queue that keeps the leftover FE WP tracks together (because the remaining FE WP tracks are still spatially correlated, as evidenced by being in a same FE extent object).

In some implementations, the control device 110 may additionally delete the FE extent object (that was mapped to the BE slice) in response to forming the BE slice. Relocating the leftover FE WP tracks and deleting the FE extent object may reduce memory overhead at the control device 110. Alternatively, the control device 110 may retain the leftover FE WP tracks in the FE extent object and reset the aging time (e.g., adjust the aging time to match a quantity of the remaining FE WP tracks).

In some implementations, the control device 110 may generate feedback after mapping FE WP tracks to BE slices.

For example, the control device 110 may determine that an FE extent object did not receive any correlated FE WP tracks even though the probability associated with the FE extent object was higher (e.g., satisfied a threshold). In another example, the control device 110 may determine that an FE extent object received a correlated FE WP track even though the probability associated with the FE extent object was lower (e.g., failed to satisfy a threshold). Accordingly, the ML model may be updated using the feedback. For example, the control device 110 may transmit the feedback to the ML host 115 (e.g., for retraining and/or refining the ML model). In implementations where the control device 110 is at least partially integrated with the ML host 115, the control device 110 may perform retraining and/or refining of the ML model.

As indicated above, FIGS. 1A-1E are provided as an example. Other examples may differ from what is described with regard to FIGS. 1A-1E.

Figure 2A:
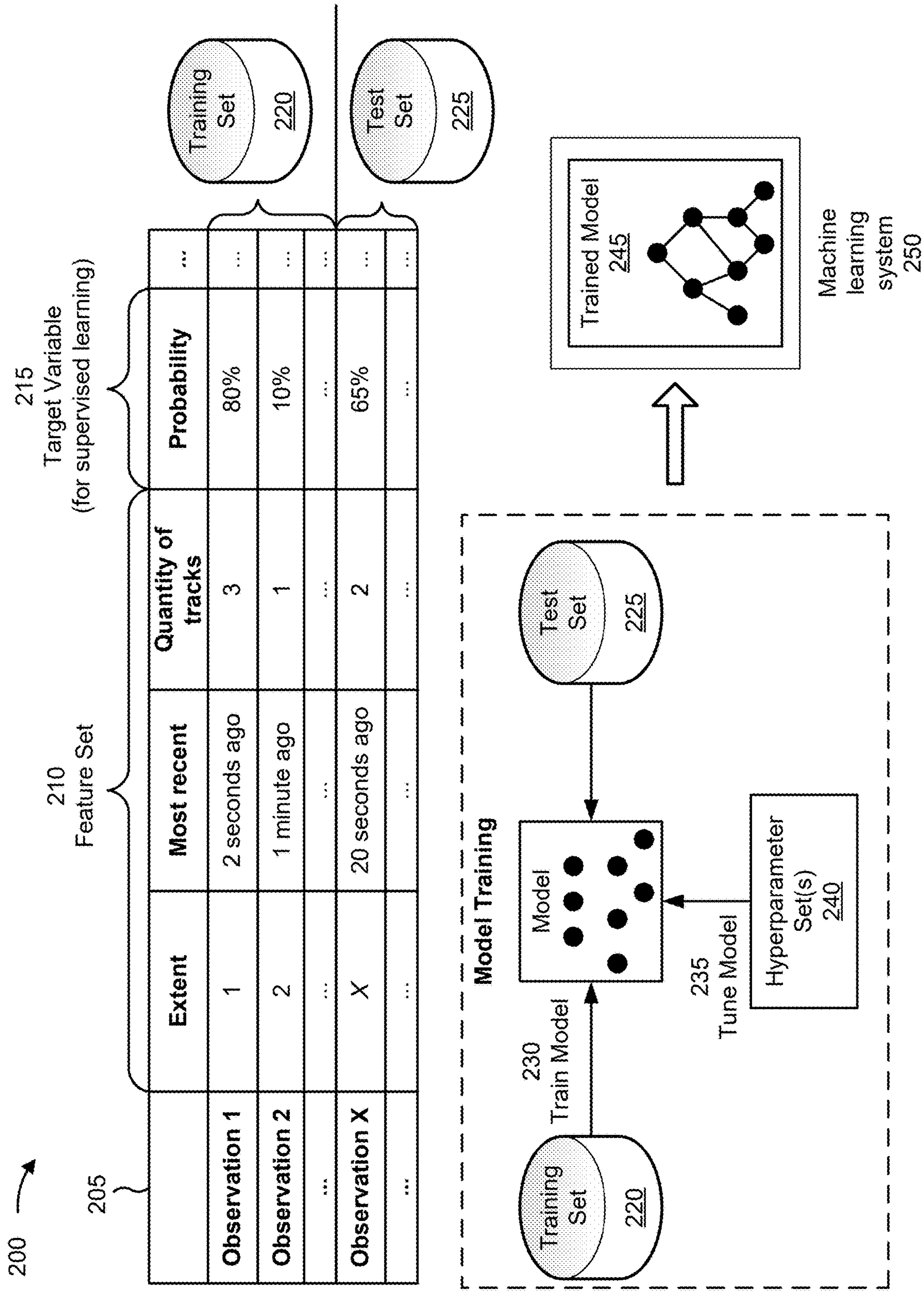
FIGS. 2A-2B are diagrams illustrating an example of training and applying a machine learning model in systems and/or methods described herein, in accordance with some embodiments of the present disclosure.
Figure 2B:
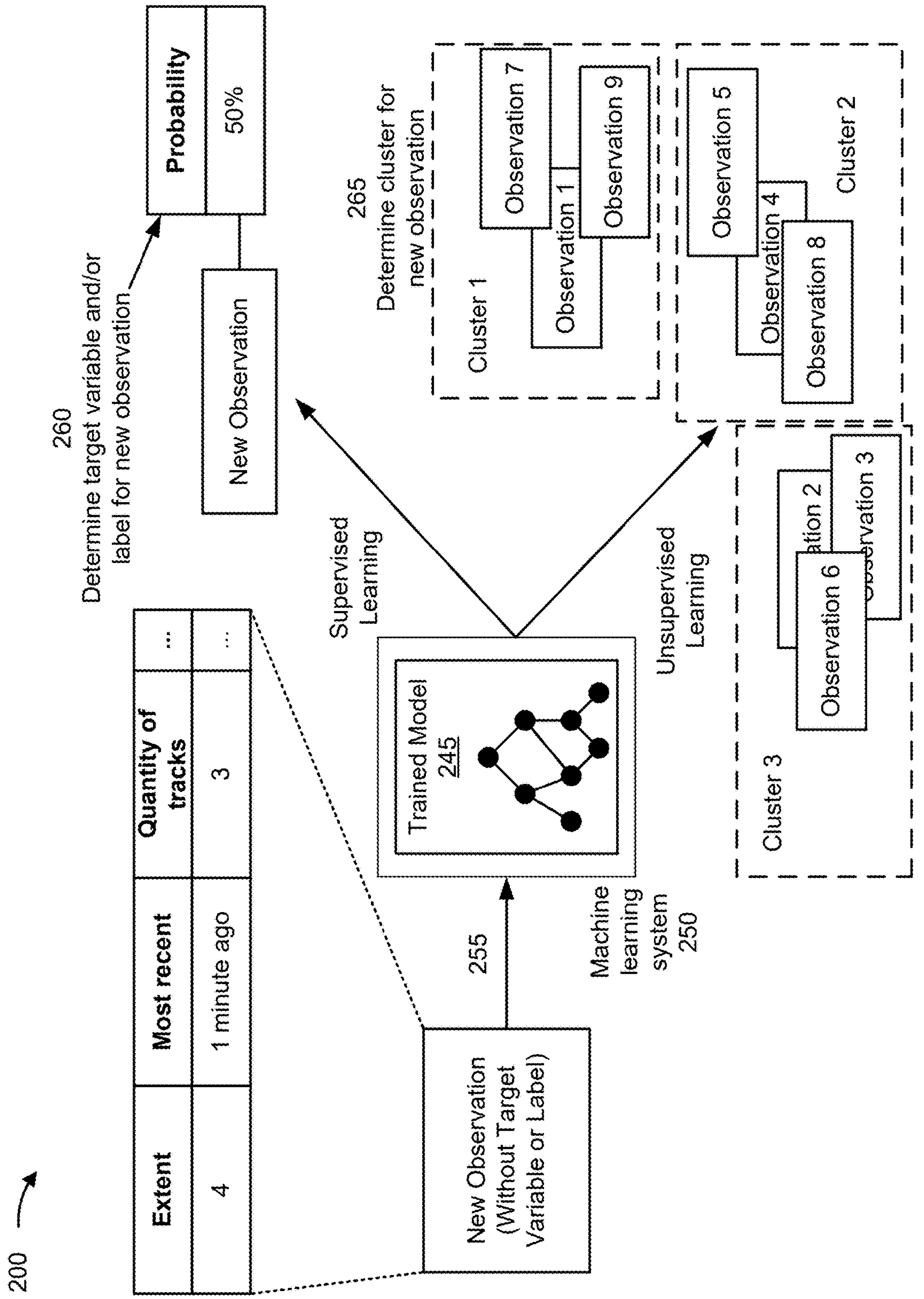

FIGS. 2A-2B are diagrams illustrating an example 200 of training and using a machine learning model in connection with predicting correlated FE tracks. The machine learning model training described herein may be performed using a machine learning system 250. The machine learning system 250 may include or may be included in a computing device, a server, a cloud computing environment, or the like, such as the control device described in more detail below. For example, the machine learning system 250 may be the same as, or at least partially separate from, an ML host 115 described herein.

As shown in FIG. 2A and by reference number 205, a machine learning model may be trained using a set of observations. The set of observations may be obtained and/or input from training data (e.g., historical data), such as data gathered during one or more processes described herein. For example, the set of observations may include data gathered from a host device, as described elsewhere herein. In some implementations, the machine learning system 250 may receive the set of observations (e.g., as input) from the host device.

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system 250 may determine variables for a set of observations and/or variable values for a specific observation based on input received from the host device. For example, the machine learning system 250 may identify a feature set (e.g., one or more features and/or corresponding feature values) from structured data input to the machine learning system 250, such as by extracting data from a particular column of a table, extracting data from a particular field of a form and/or a message, and/or extracting data received in a structured data format. Additionally, or alternatively, the machine learning system 250 may receive input from an operator to determine features and/or feature values. In some implementations, the machine learning system 250 may perform natural language processing and/or another feature identification technique to extract features (e.g., variables) and/or feature values (e.g., variable values) from text (e.g., unstructured data) input to the machine learning system 250, such as by identifying keywords and/or values associated with those keywords from the text.

As an example, a feature set for a set of observations may include a first feature of an extent number, a second feature of a most recent track arrival time, a third feature of a quantity of tracks, and so on. As shown, for a first observation, the first feature may have a value of "1," the second feature may have a value of "2 seconds ago," the third feature may have a value of "3," and so on. These features and feature values are provided as examples, and may differ in other examples. For example, the feature set may include one or more of the following features: a track number, an extent size, and/or an initial track arrival time, among other examples. In some implementations, the machine learning system 250 may pre-process and/or perform dimensionality reduction to reduce the feature set and/or combine features of the feature set to a minimum feature set. A machine learning model may be trained on the minimum feature set, thereby conserving resources of the machine learning system 250 (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is a probability of an additional correlated track arriving, which has a value of "80%" for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system 250 may partition the set of observations into a training set 220 that may include a first subset of observations, of the set of observations, and a test set 225 that may include a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system 250 may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system 250 may randomly select observations to be included in the training set 220 and/or the test set 225.

As shown by reference number 230, the machine learning system 250 may train a machine learning model using the training set 220. This training may include executing, by the machine learning system 250, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system 250 may use one or more hyperparameter sets 240 to tune the machine learning model. A hyperparameter may include a structural parameter that controls execution of a machine learning algorithm by the machine learning system 250, such as a constraint applied to the machine learning algorithm. Unlike a model parameter, a hyperparameter is not learned from data input into the model. An example hyperparameter for a regularized regression algorithm may include a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system 250 may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system 250 may tune each machine learning algorithm using one or more hyperparameter sets 240 (e.g., based on operator input that identifies hyperparameter sets 240 to be used and/or based on randomly generating hyperparameter values). The machine learning system 250 may train a particular machine learning model using a specific machine learning algorithm and a corresponding hyperparameter set 240. In some implementations, the machine learning system 250 may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system 250 may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system 250 may train a machine learning model on the training groups and then test the machine learning model on the hold-out group to generate a cross-validation score. The machine learning system 250 may repeat this training procedure using different hold-out groups and different test groups to generate a cross-validation score for each training procedure. In some implementations, the machine learning system 250 may independently train the machine learning model k times, with each individual group being used as a hold-out group once and being used as a training group k−1 times. The machine learning system 250 may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system 250 may perform cross-validation when training a machine learning model by splitting the training set into a number of groups (e.g., based on operator input that identifies the number of groups and/or based on randomly selecting a number of groups). The machine learning system 250 may perform multiple training procedures and may generate a cross-validation score for each training procedure. The machine learning system 250 may generate an overall cross-validation score for each hyperparameter set 240 associated with a particular machine learning algorithm. The machine learning system 250 may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system 250 may then train the machine learning model using the selected hyperparameter set 240, without cross-validation (e.g., using all of data in the training set 220 without any hold-out groups), to generate a single machine learning model for a particular machine learning algorithm. The machine learning system 250 may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system 250 may store that machine learning model as a trained machine learning model 245 to be used to analyze new observations, as described below in connection with FIG. 3.

In some implementations, the machine learning system 250 may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system 250 may generate multiple machine learning models, where each machine learning model has the best overall cross-validation score for a corresponding machine learning algorithm. The machine learning system 250 may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

FIG. 2B is a diagram illustrating an example of applying the trained machine learning model 245 to a new observation. As shown by reference number 255, the machine learning system 250 may receive a new observation (or a set of new observations), and may input the new observation to the machine learning model 245. As shown, the new observation may include a first feature of "4," a second feature of "1 minute ago," a third feature of "3," and so on, as an example. The machine learning system 250 may apply the trained machine learning model 245 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

As an example, the trained machine learning model 245 may predict a value of "50%" for the target variable of the probability (of an additional correlated track arriving) for the new observation, as shown by reference number 260. Based on this prediction (e.g., based on the value having a particular label or classification or based on the value satisfying or failing to satisfy a threshold), the machine learning system 250 may provide a recommendation and/or output for determination of a recommendation, such as an indication to increase an aging time for an FE extent object represented by the new observation. Additionally, or alternatively, the machine learning system 250 may perform an automated action and/or may cause an automated action to be performed (e.g., by instructing another device to perform the automated action), such as decreasing an aging threshold for the FE extent object. As another example, if the machine learning system 250 were to predict a value of "75%" for the target variable of the probability, then the machine learning system 250 may provide a different recommendation (e.g., an indication to decrease an aging time for the FE extent object) and/or may perform or cause performance of a different automated action (e.g., increasing an aging threshold for the FE extent object). In some implementations, the recommendation and/or the automated action may be based on the target variable value having a particular label (e.g., classification or categorization) and/or may be based on whether the target variable value satisfies one or more thresholds (e.g., whether the target variable value is greater than a threshold, is less than a threshold, is equal to a threshold, or falls within a range of threshold values).

In some implementations, the trained machine learning model 245 may classify (e.g., cluster) the new observation in a cluster, as shown by reference number 265. The observations within a cluster may have a threshold degree of similarity. As an example, if the machine learning system 250 classifies the new observation in a first cluster (e.g., likely to receive an additional correlated FE WP track), then the machine learning system 250 may provide a first recommendation, such as an indication to decrease an aging time for the FE extent object. Additionally, or alternatively, the machine learning system 250 may perform a first automated action and/or may cause a first automated action to be performed (e.g., by instructing another device to perform the automated action) based on classifying the new observation in the first cluster, such as increasing an aging threshold for the FE extent object. As another example, if the machine learning system 250 were to classify the new observation in a second cluster (e.g., unlikely to receive an additional correlated FE WP track), then the machine learning system 250 may provide a second (e.g., different) recommendation (e.g., an indication to increase an aging time for the FE extent object) and/or may perform or cause performance of a second (e.g., different) automated action, such as decreasing an aging threshold for the FE extent object. The recommendations, actions, and clusters described above are provided as examples, and other examples may differ from what is described above.

In this way, the machine learning system 250 may apply a rigorous and automated process to forming BE slices from FE WP tracks. As a result, the machine learning system 250 reduces latency for FE WP tracks that are unlikely to be correlated while optimizing write operations for FE WP tracks that are likely to be correlated.

As indicated above, FIGS. 2A-2B are provided as an example. Other examples may differ from what is described in connection with FIGS. 2A-2B. For example, the machine learning model may be trained using a different process than what is described in connection with FIG. 2A. Additionally, or alternatively, the machine learning model may employ a different machine learning algorithm than what is described in connection with FIGS. 2A-2B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
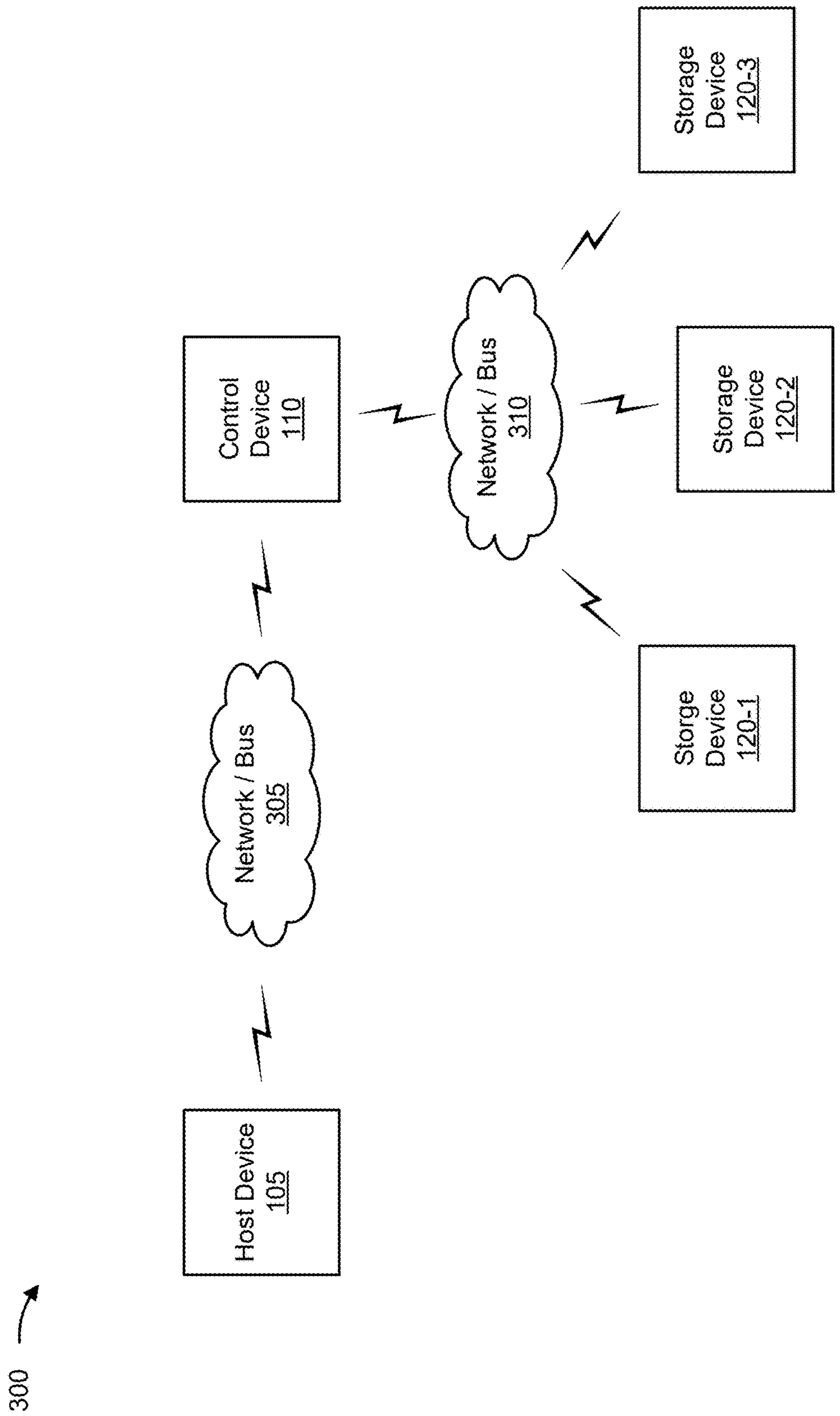
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a host device 105 and a control device 110 connected via a network (and/or bus) 305. Additionally, environment 300 may include a set of storage devices 120 (shown as storage device 120-1, storage device 120-2, and storage device 120-3 in FIG. 3) connected to the control device 110 via a network (and/or bus) 310.

The host device 105 may include one or more devices capable of receiving, generating, storing, processing, providing, and/or routing FE tracks to and from the set of storage devices 120 (via the control device 110), as described elsewhere herein. The host device 105 may include a communication device and/or a computing device. For example, the host device 105 may include a server, such as an application server, a client server, a web server, a database server, a host server, a proxy server, a virtual server (e.g., executing on computing hardware), or a server in a cloud computing system. In some implementations, the host device 105 may include computing hardware used in a cloud computing environment. The host device 105 may execute an OS that uses the set of storage devices 120.

The control device 110 may include one or more devices capable of receiving, generating, storing, processing, providing, and/or routing tracks for BE slices to and from the set of storage devices 120, as described elsewhere herein. The control device 110 may include a communication device and/or a computing device. For example, the control device 110 may include a server, a host server, a proxy server, a virtual server (e.g., executing on computing hardware), or a server in a cloud computing system.

The network and/or bus 305 may include one or more wired and/or wireless networks. For example, the network and/or bus 305 may include a wireless wide area network (e.g., a cellular network or a public land mobile network), a local area network (e.g., a wired local area network or a wireless local area network (WLAN), such as a Wi-Fi network), a personal area network (e.g., a Bluetooth® network), a near-field communication network, a telephone network, a private network, the Internet, and/or a combination of these or other types of networks. Additionally, or alternatively, the network and/or bus 305 may include an electrical connection (e.g., a wire, a trace, and/or a lead) and/or a wireless bus. The network and/or bus 305 may enable communications between the host device 105 and the control device 110.

Each storage device (e.g., the storage device 120-1, the storage device 120-2, or the storage device 120-3) may include one or more devices capable of receiving, generating, storing, processing, and/or providing information as BE slices, as described elsewhere herein. The storage devices 120 may include non-transitory computer-readable media and may be configured in a RAID configuration. Although the example environment 300 includes three storage devices, other examples may include fewer storage devices (e.g., two storage devices) or additional storage devices (e.g., four storage devices, five storage devices, and so on).

The network and/or bus 310 may include one or more wired and/or wireless networks. For example, the network and/or bus 310 may include a wireless wide area network (e.g., a cellular network or a public land mobile network), a local area network (e.g., a wired local area network or a WLAN, such as a Wi-Fi network), a personal area network (e.g., a Bluetooth network), a near-field communication network, a telephone network, a private network, the Internet, and/or a combination of these or other types of networks. Additionally, or alternatively, the network and/or bus 310 may include an electrical connection (e.g., a wire, a trace, and/or a lead) and/or a wireless bus. The network and/or bus 310 may enable communications between the control device 110 and the storage devices 120.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
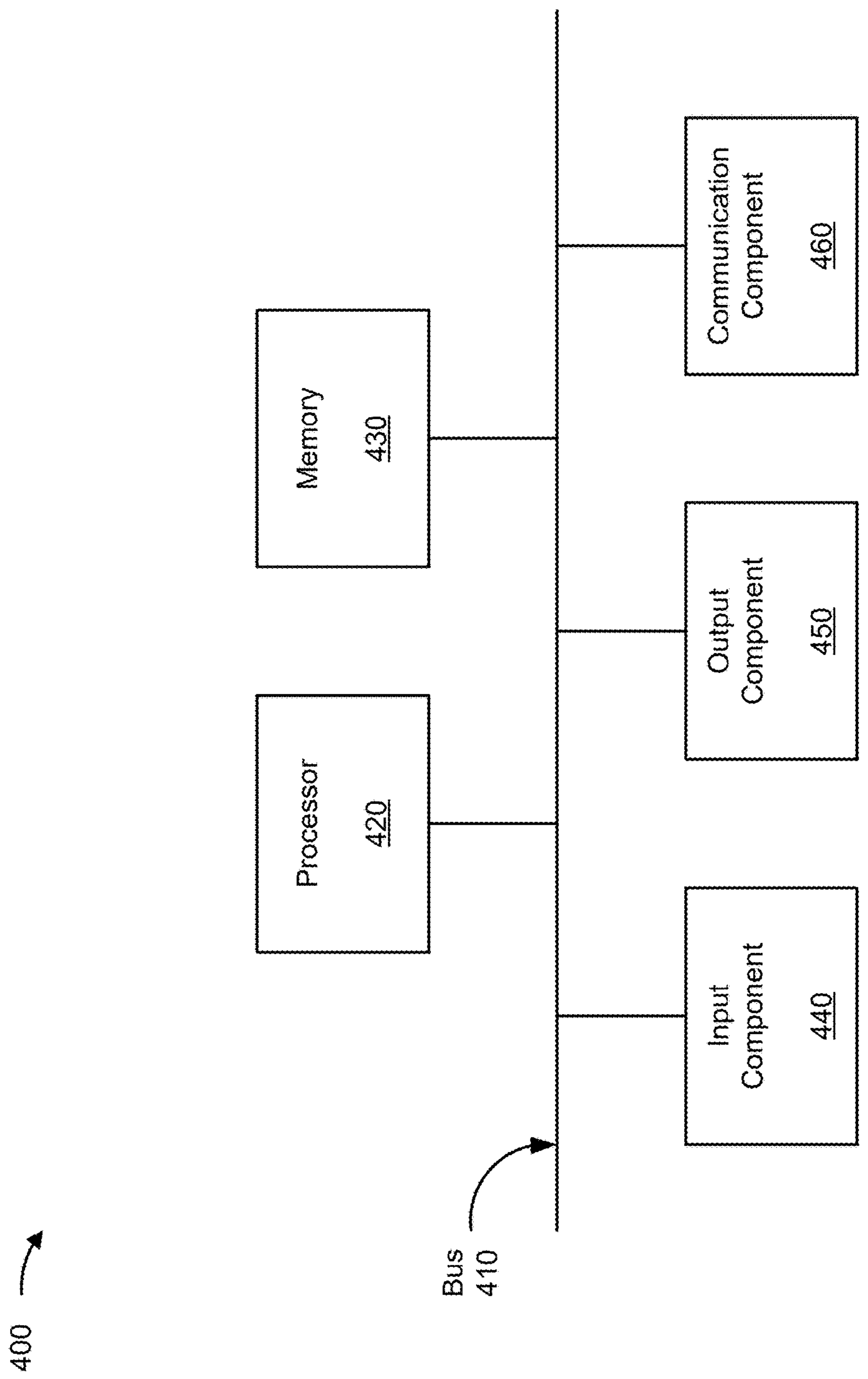
FIG. 4 is a diagram of example components of one or more devices of FIG. 3, in accordance with some embodiments of the present disclosure.

FIG. 4 is a diagram of example components of a device 400 associated with clustering FE tracks to optimize BE write operations. The device 400 may correspond to a host device 105, a control device 110, and/or a set of storage devices 120. In some implementations, a host device 105, a control device 110, and/or a set of storage devices 120 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
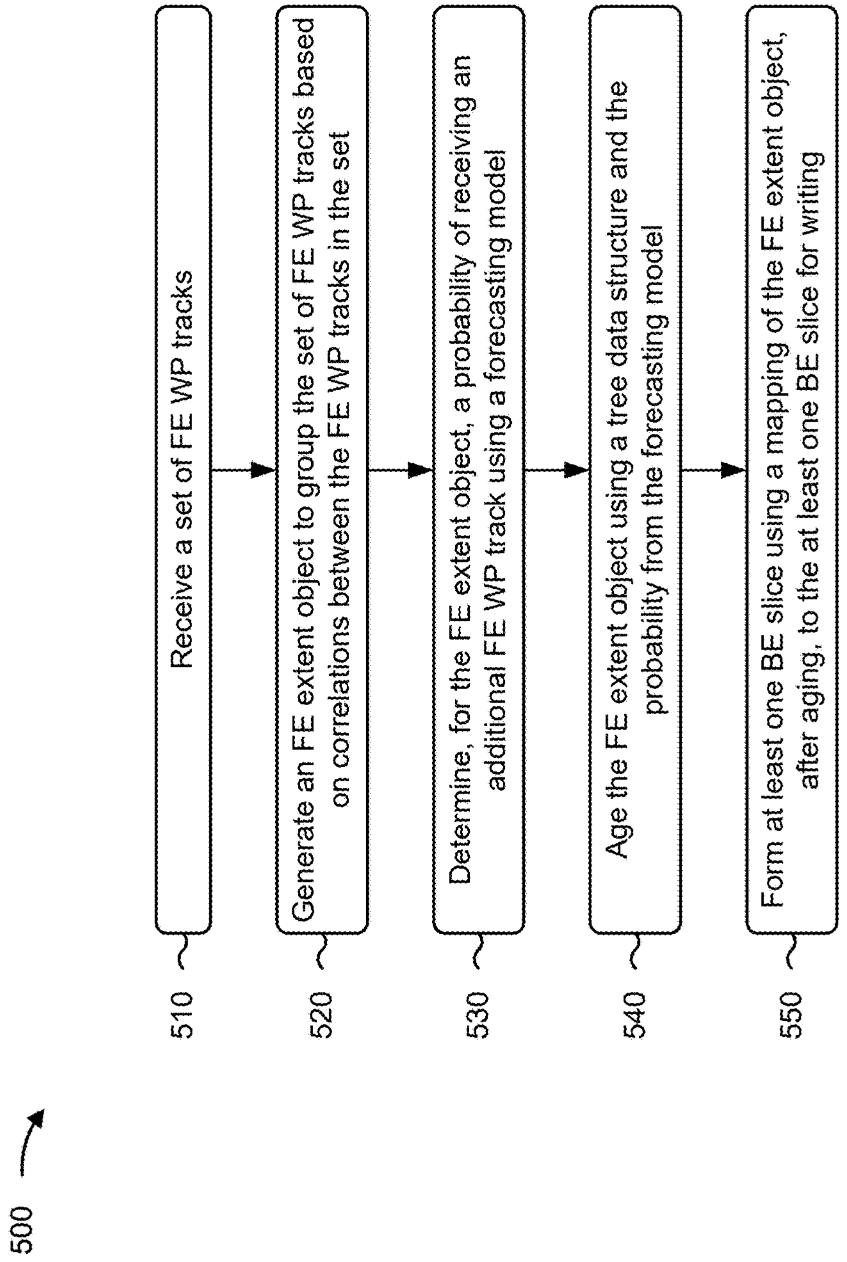
FIG. 5 is a flowchart of an example process relating to clustering FE tracks to optimize BE write operations, in accordance with some embodiments of the present disclosure.

FIG. 5 is a flowchart of an example process 500 associated with clustering FE tracks to optimize BE write operations. In some implementations, one or more process blocks of FIG. 5 may be performed by a control device 110. In some implementations, one or more process blocks of FIG. 5 may be performed by another device or a group of devices separate from or including the control device 110, such as a host device 105 and/or a set of storage devices 120. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a set of FE WP tracks (block 510). For example, the control device 110 (e.g., using processor 420, memory 430, and/or communication component 460) may receive a set of FE WP tracks, as described above in connection with reference number 125 of FIG. 1A. As an example, the control device 110 may receive the set of FE WP tracks from a host device. The control device 110 may receive the set of FE WP tracks in response to input from a user. Additionally, or alternatively, the host device may transmit the set of FE WP tracks to the control device 110 automatically.

As further shown in FIG. 5, process 500 may include generating an FE extent object to group the set of FE WP tracks based on correlations between the FE WP tracks in the set (block 520). For example, the control device 110 (e.g., using processor 420 and/or memory 430) may generate an FE extent object to group the set of FE WP tracks based on correlations between the FE WP tracks in the set, as described above in connection with reference number 130 of FIG. 1A. As an example, the tree data structure may include a B-Tree structure, and the control device 110 may add the FE WP tracks to the tree data structure.

As further shown in FIG. 5, process 500 may include determining, for the FE extent object, a probability of receiving an additional FE WP track using a forecasting model (block 530). For example, the control device 110 (e.g., using processor 420, memory 430, and/or communication component 460) may determine, for the FE extent object, a probability of receiving an additional FE WP track using a forecasting model, as described above in connection with reference numbers 135 and 140 of FIG. 1B. As an example, the forecasting model may be as described in connection with FIGS. 2A-2B.

As further shown in FIG. 5, process 500 may include aging the FE extent object using a tree data structure and the probability from the forecasting model (block 540). For example, the control device 110 (e.g., using processor 420 and/or memory 430) may age the FE extent object using a tree data structure and the probability from the forecasting model, as described above in connection with reference number 145 of FIG. 1B. As an example, the control device 110 may calculate an aging time for the FE extent object based on the probability. In some implementations, the control device 110 may also determine an aging threshold for the FE extent object.

As further shown in FIG. 5, process 500 may include forming at least one BE slice using a mapping of the FE extent object, after aging, to the at least one BE slice for writing (block 550). For example, the control device 110 (e.g., using processor 420, memory 430, and/or communication component 460) may form at least one BE slice using a mapping of the FE extent object, after aging, to the at least one BE slice for writing, as described above in connection with reference number 175 of FIG. 1E. As an example, the set of FE WP tracks in the FE extent object may be mapped to the at least one BE slice in response to the aging time associated with the FE extent object satisfying the aging threshold (for the FE extent object).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E and/or FIGS. 2A-2B. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z." No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by a control device, a plurality of front-end (FE) write pending (WP) tracks;

clustering, by the control device, the plurality of FE WP tracks into one or more FE extent objects using spatial correlations, wherein the spatial correlations comprise correlations between logical block addresses (LBAs) associated with the FE WP tracks;

adding, by the control device, the one or more FE extent objects to a tree data structure;

forming back-end (BE) slices, by the control device, using a mapping of the one or more FE extent objects from the tree data structure and to the BE slices based on an aging threshold; and storing, by the control device, based on the mapping and the aging threshold, FE WP tracks from a same FE extent object in a same BE slice of one or more storage devices.

2. The method of claim 1, further comprising:

determining, by the control device, the aging threshold for an FE extent object, in the one or more FE extent objects, based on a quantity of FE WP tracks in the FE extent object.

3. The method of claim 1, further comprising:

receiving, by the control device, an additional FE WP track; and adding, by the control device, the additional FE WP track to an FE extent object, in the one or more FE extent objects, using the tree data structure.

4. The method of claim 3, further comprising:

searching, by the control device, the tree data structure using an index associated with the additional FE WP track, wherein the additional FE WP track is added to the FE extent object based on an outcome of searching the tree data structure.

5. The method of claim 1, further comprising:

initializing, by the control device, the one or more FE extent objects.

6. The method of claim 1, further comprising:

deleting, by the control device, the one or more FE extent objects from the tree data structure based on the one or more FE extent objects being mapped to the BE slices.

7. The method of claim 1, further comprising:

relocating, by the control device, any leftover FE WP tracks from the one or more FE extent objects to a dedicated queue.

8. The method of claim 1, further comprising:

determining, by the control device, a WP pressure; and determining, by the control device, the aging threshold based on the WP pressure.

9. The method of claim 1, further comprising:

determining, by the control device, a probability, using a forecasting model, of receiving an additional FE write pending (WP) track for an FE extent object; and identifying, by the control device, the aging threshold for the FE extent object based on the probability.

10. A device, comprising:

one or more processors configured to:

generate a front-end (FE) extent object representing a set of correlated FE write pending (WP) tracks;

determine, for the FE extent object, a probability of receiving an additional correlated FE WP track within a defined time window using a forecasting model;

form back-end (BE) slices using a mapping of the set of correlated FE WP tracks from the FE extent object to the BE slices based on the probability from the forecasting model; and issue, based on the mapping, one or more write operations to one or more storage devices to store the set of correlated FE WP tracks from the FE extent object in a same BE slice.

11. The device of claim 10, wherein the one or more processors are configured to:

generate feedback after mapping the set of correlated FE WP tracks to the BE slices, wherein the forecasting model is updated using the feedback.

12. The device of claim 10, wherein the one or more processors are configured to:

calculate an aging time for the FE extent object based on the probability from the forecasting model, wherein the set of correlated FE WP tracks are mapped to the BE slices based on the aging time.

13. The device of claim 10, wherein the one or more processors are configured to:

relocate remaining FE WP tracks from the FE extent object to a leftover queue after mapping the set of correlated FE WP tracks to the BE slices.

14. The device of claim 10, wherein the one or more processors are configured to:

receive an additional FE WP track; and add the additional FE WP track to the FE extent object based on a correlation between the additional FE WP track and the set of correlated FE WP tracks.

15. A non-transitory computer-readable medium storing a set of instructions, the set of instructions comprising:

one or more instructions that, when executed by one or more processors of a device, cause the device to:

receive a set of front-end (FE) write pending (WP) tracks;

generate an FE extent object to group the set of FE WP tracks based on correlations between the FE WP tracks in the set;

determine, for the FE extent object, a probability of receiving an additional FE WP track using a forecasting model;

age the FE extent object using a tree data structure and the probability from the forecasting model;

form at least one back-end (BE) slice using a mapping of the FE extent object, after aging, to the at least one BE slice for writing; and store, based on the mapping, the set of FE WP tracks from the FE extent object in the at least one BE slice of one or more storage devices.

16. The non-transitory computer-readable medium of claim 15, wherein the one or more instructions, when executed by the one or more processors, cause the device to:

receive the additional FE WP track; and add the additional FE WP track to the FE extent object using the tree data structure.

17. The non-transitory computer-readable medium of claim 15, wherein the one or more instructions, when executed by the one or more processors, cause the device to:

delete the FE extent object from the tree data structure based on mapping the FE extent object to the at least one BE slice.

18. The non-transitory computer-readable medium of claim 15, wherein the one or more instructions, when executed by the one or more processors, cause the device to:

relocate remaining FE WP tracks from the FE extent object to a leftover queue after mapping the FE extent object to the at least one BE slice.

19. The non-transitory computer-readable medium of claim 15, wherein the one or more instructions, when executed by the one or more processors, cause the device to:

generate feedback after mapping the FE extent object to the at least one BE slice, wherein the forecasting model is updated using the feedback.

20. The non-transitory computer-readable medium of claim 15, wherein the correlations between the FE WP tracks in the set comprise correlations between logical block addresses (LBAs) associated with the FE WP tracks in the set.

* * * * *